United States Patent [19]
Arledge et al.

[11] Patent Number: 5,965,996
[45] Date of Patent: Oct. 12, 1999

[54] ELECTRICAL SCOOTER HAVING AN EQUALIZATION CIRCUIT FOR CHARGING MULTIPLE BATTERIES

[75] Inventors: Arthur L. Arledge, Basking Ridge; Russell G. Dobrowski, Clinton, both of N.J.; Peter S. Hughes, South Harwich, Mass.; Andrew N. Szabo, Providence, R.I.

[73] Assignee: Vectrix Corporation, Newport, R.I.

[21] Appl. No.: 08/989,174

[22] Filed: Dec. 11, 1997

[51] Int. Cl.$^6$ ........................................................ H02J 7/00
[52] U.S. Cl. .............................................................. 320/116
[58] Field of Search ..................................... 320/122, 116, 320/126, 118, 148, 149

[56] References Cited

U.S. PATENT DOCUMENTS

| | | | |
|---|---|---|---|
| 5,467,007 | 11/1995 | Hyakutake | 320/158 |
| 5,483,144 | 1/1996 | Marek | 320/126 |
| 5,504,415 | 4/1996 | Podrazhansky et al. | 320/118 |
| 5,539,297 | 7/1996 | Fiebig | 320/126 |
| 5,557,189 | 9/1996 | Suzuki et al. | 320/119 |
| 5,561,360 | 10/1996 | Ayres et al. | 320/129 |
| 5,576,608 | 11/1996 | Nagai et al. | 320/159 |
| 5,578,914 | 11/1996 | Morita | 320/122 |
| 5,592,067 | 1/1997 | Peter et al. | 320/103 |
| 5,602,481 | 2/1997 | Fukuyama | 324/426 |
| 5,637,979 | 6/1997 | Tamai et al. | 320/116 |
| 5,640,079 | 6/1997 | Nelson et al. | 320/21 |
| 5,642,029 | 6/1997 | Seragnoli | 320/163 |
| 5,642,031 | 6/1997 | Brotto | 320/156 |
| 5,644,210 | 7/1997 | Hwang | 320/148 |
| 5,646,504 | 7/1997 | Feldstein | 320/119 |
| 5,646,507 | 7/1997 | Timmons et al. | 320/149 |
| 5,659,240 | 8/1997 | King | 320/134 |

Primary Examiner—Peter S. Wong
Assistant Examiner—Lawrence Luk
Attorney, Agent, or Firm—Pennie & Edmonds LLP

[57] ABSTRACT

An electric scooter employs an equalization circuit for charging a plurality of series connected batteries used to power the scooter. The equalization circuit has a number of cell circuits, each connected across the terminals of a corresponding battery. Each cell circuit includes two voltage detectors, a first implemented as a modular voltage monitor for detecting a low voltage across the battery terminals, and the second implemented as a Zener diode to detect a high voltage across the battery terminals. Both voltage monitors are enabled by an optocoupler switch. When the switch is turned on and either a low or a high voltage condition is detected, the cell circuit outputs a signal reflective of this condition through a second optocoupler. During a constant current charging phase, a high voltage condition causes the cell circuit to cause a portion of the charging current to bypass that battery, thus achieving equalization. A controller, which selectively enables the first optocoupler, also receives outputs from logic circuitry which tells whether any of batteries have low voltage and also whether the series connected batteries are fully charged. The scooter monitors the batteries for low voltage conditions during starting and also during quiescent states, i.e., low or no current draw, when it is being operated.

4 Claims, 4 Drawing Sheets

ELECTRICAL SCOOTER HAVING AN EQUALIZATION CIRCUIT FOR CHARGING MULTIPLE BATTERIES

BACKGROUND OF THE INVENTION

The present invention relates to an equalization apparatus and method for controlling the charging of a battery pack comprising a plurality of series-connected batteries. More particularly, it concerns an equalization circuit adapted for use during a constant current charging phase of a battery pack associated with a two-wheeled electrical motor scooter.

The prior art teaches a number of methods for charging a battery pack comprising a plurality of series-connected batteries. A well-known approach is to first charge them at a constant voltage until they are partially charged and further charging them at a constant current to bring them to a full charge. Another technique, taught in U.S. Pat. No. 5,637,979 to Tamai et al,. is to charge them at a constant current until any one battery reaches a predetermined voltage, and then reduce the charging current to that battery, while increasing the voltage applied to the remaining batteries.

Regardless of the approach taken to charge the battery pack, equalization must be performed to ensure that batteries are evenly charged. Uneven charging among the batteries in a battery pack degrades its ability to supply sufficient power to a given load, and also shortens the life of the batteries in the battery pack. Typically, during a constant current charging phase, an equalization circuit gauges the charge status of each battery, and diverts and allocates charging current, as needed, among the batteries in the battery pack.

Most often, the charge state of a battery is determined by measuring its voltage and temperature, and perhaps also other parameters. The equalization circuit then prevents overcharging by bypassing current once the batteries have become fully charged, as determined by one or more voltage and current saturation detecting mechanisms. In this regard, U.S. Pat. No. 5,504,415 to Podrazhansky is directed to an equalization circuit which takes into consideration individual battery temperature to perform equalization, and shunts current around batteries based on their temperatures. U.S. Pat. No. 5,592,067 to Peter et al. employs switched mode power converters to regulate equalization cell circuits associated with each pair of adjacent batteries, based on a comparison of voltages of those batteries. U.S. Pat. No. 5,578,914 to Morita discloses circuitry for constant voltage charging and subsequent detection of saturation of a bypass current to prevent damage to the batteries. The contents of the above patents are incorporated by reference to the extent necessary to understand the present invention.

SUMMARY OF THE INVENTION

An objective of the present invention is to provide an electric scooter which is powered by a plurality of series connected batteries, with a charge equalization circuit which can be used for bypassing current during a constant current charging operation, and also for monitoring low voltage conditions in the batteries so as to inform a user that the scooter's batteries need to be recharged.

This objective is realized by an equalization circuit which comprises an equalization cell circuit ("cell") connected to each of the batteries. Each cell is provided with a low voltage detector, for detecting voltages less than a first predetermined value. Low voltage detection is performed during periods where there is little or no current draw from the batteries. Each cell also includes a high voltage detector for detecting voltages greater than a second predetermined value which is higher than the first predetermined value. A first switch enables both voltage detectors, in response to a signal from outside the cell. If either a low voltage value is detected by the low voltage detector, or a high voltage value is detected by the high voltage detector, a second switch outputs a status signal indicating that either a high or a low voltage value has been detected. Logic circuitry connected to each of the second switches determines whether any one of the cells detected a low voltage, or whether all of the cells detected a high voltage. When the former is true, the user of the scooter is signaled that recharging is needed; and when the latter is true, the constant current charging operation is discontinued. In addition to simply notifying a user that the batteries need to be recharged, the low voltage monitoring function of the equalization circuit can be used to prevent a scooter from starting, or from further use, to prevent damage to the batteries.

BRIEF DESCRIPTION OF THE DRAWINGS

These and other features, aspects, and advantages of the present invention can be seen in the drawings in which.

DESCRIPTION OF THE PREFERRED EMBODIMENTS

Figure 1:
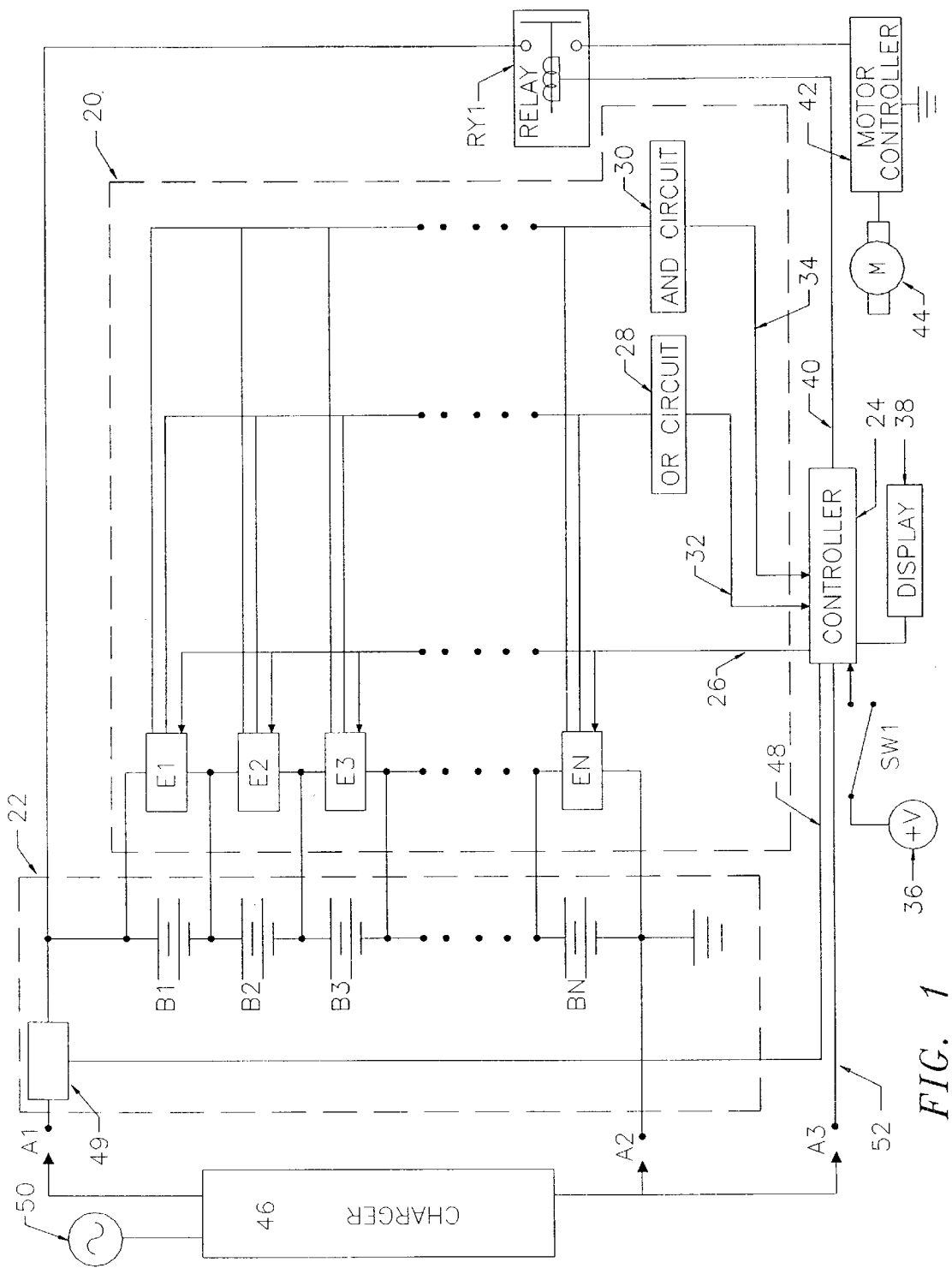
FIG. 1 is an electrical schematic showing an equalization circuit of the present invention in its environment for charging and monitoring a battery pack powering a motor load.

FIG. 1 shows an equalization circuit ("equalizer") 20 connected to a battery pack 22, which comprises N number of batteries, $B_i$, $i = 1, 2, \ldots, N$, which are 12 volt lead-acid batteries, of the sort found in motor vehicles. The equalizer 20, in turn, comprises N number of equalization cell circuits ("cell" or "cell circuit") designated by $E_i$, $i = 1, 2, \ldots, N$, one corresponding to each battery.

The equalizer 20 is connected to an equalization controller 24 which, in the preferred embodiment, is a Motorola MC68HC11. The controller 24 outputs an enable signal via an electrical connection 26 to activate each cell $E_i$, $i = 1, 2, \ldots N$. It should be understood that the controller 24 may activate all the cells at the same time, as shown, or, alternatively, may selectively activate individual cells, given appropriate addressing logic, multiplexers, and the like.

The controller 24 receives inputs from OR circuitry 28 and AND circuitry 30 of the equalizer 20, via lines 32 and 34, respectively. The OR circuitry outputs an active signal when any one of cells has reached a predetermined state, and the AND circuitry outputs an active signal when all of the cells have reached a predetermined state.

The schematic of FIG. 1 shows a switch SW1 connected to the controller 24. Switch SW1 is closed when the ignition of the scooter is turned on by a user. When switch SW1 is closed, the controller 24 is connected to an auxiliary power source 36. In the preferred embodiment, auxiliary power source 36 is a battery or other power source other than those belonging to the battery pack 22.

When switch SW1 is closed, the controller 24 controller executes an initialization sequence. As part of this sequence, the controller 24 outputs an enable signal on line 26 and enables the cells Ei. This causes each cell to measure the battery voltage in its corresponding battery Bi within the battery pack 22. If any battery Bi has a voltage that is below a predetermined threshold, its corresponding cell Ei outputs a signal reflective of the low voltage condition. After outputting the enable signal during system initialization, the controller 24 monitors the outputs of the OR circuit to determine whether any of the batteries Bi has a low voltage.

If any one of the batteries is low, the controller will signal another unit 38, which may be an LED, or other display known in the art, to signify that the battery pack needs to be recharged. Unit 38 may instead be a second controller which may make further use of this information. Since at least one of the batteries is low, Power relay RY1, which is a Kilovac EV250-2A-01, is not enabled by the controller, even if all other system checks indicate that the scooter is ready to be started and driven. This prevents operation of the scooter in situations where there is considerable chance that the user may not be able to complete a significant portion of the trip.

If, on the other hand, none of the batteries is determined to be low during initialization, and all other system checks are okay, the controller 24 outputs a signal on line 40 to enable the power relay RY1. When the power relay RY1 is enabled, it connects power from the battery pack 22 to a motor controller 42, which is a solid state pulse-width modulating integrated controller. The motor controller 42, in turn, provides 3-phase power to the motor 44, preferably a PM brushless dc skewed-slot motor with 3-phase windings. The energized motor 44 is operatively connected to drive the scooter.

Once the motor 44 has been started, during operation of the scooter, the controller 24 intermittently, and preferable periodically, enables the cells Ei to gauge the voltage of the batteries. If any of the batteries is low, this is determined by the controller 24 via line 32. The controller then outputs a warning signal to the display 38 to advise the user that the battery pack needs to be recharged, or, under certain conditions, will completely shut down scooter operation in order to prevent damage to the batteries.

FIG. 1 further illustrates a battery charger 46 connectable in parallel to the battery pack 22 via a connector represented by nodes A1, A2 and A3, wherein A2 and A3 are tied together within the connector. To charge the battery pack 22, one must first connect the charger 46 to a 120 volt AC source 50, such as a standard wall outlet, although alternate power sources may be used, as well. When the charger 46 is connected to battery pack 22 via a connector containing nodes A1 and A2, a ground at node A3 signals controller 24 via a line 52 that a charge cycle is to begin. Controller 24 now closes relay 49 via line 49 so that the charger 46 can begin charging the battery pack 22. During charging, the controller 24 monitors the output of the AND circuit 30 to determine when all of the batteries Bi have become fully charged. Once all batteries have been charged, the controller signals charging relay 49 to open via line 48, thus breaking the connection between charger 46 and battery pack 22.

The charger 46 may be onboard the scooter, which allows one to recharge the scooter's battery pack virtually anywhere by plugging into a wall socket. However, due to weight and size limitations, it may be more economical to provide a commercially-available stand-alone charger. In the latter case, the charger can be electrically connected to opposite ends of the battery pack at nodes A1 and A2.

During charging, the controller 24 and charger 46 cooperate to charge the battery pack 22 in two stages. First, the 12 volt batteries are charged at a constant voltage for approximately 4–5 hours to take them to approximately 80% of full charge, based on bringing a battery pack comprising 10 batteries to a total of 147 volts. Next, a constant current of about 0.5 amps is applied for about 1–2 hours to bring all the batteries to a voltage of 15.6 volts. The equalizer 20 functions during this second, constant current portion of this charging sequence.

Figure 2:
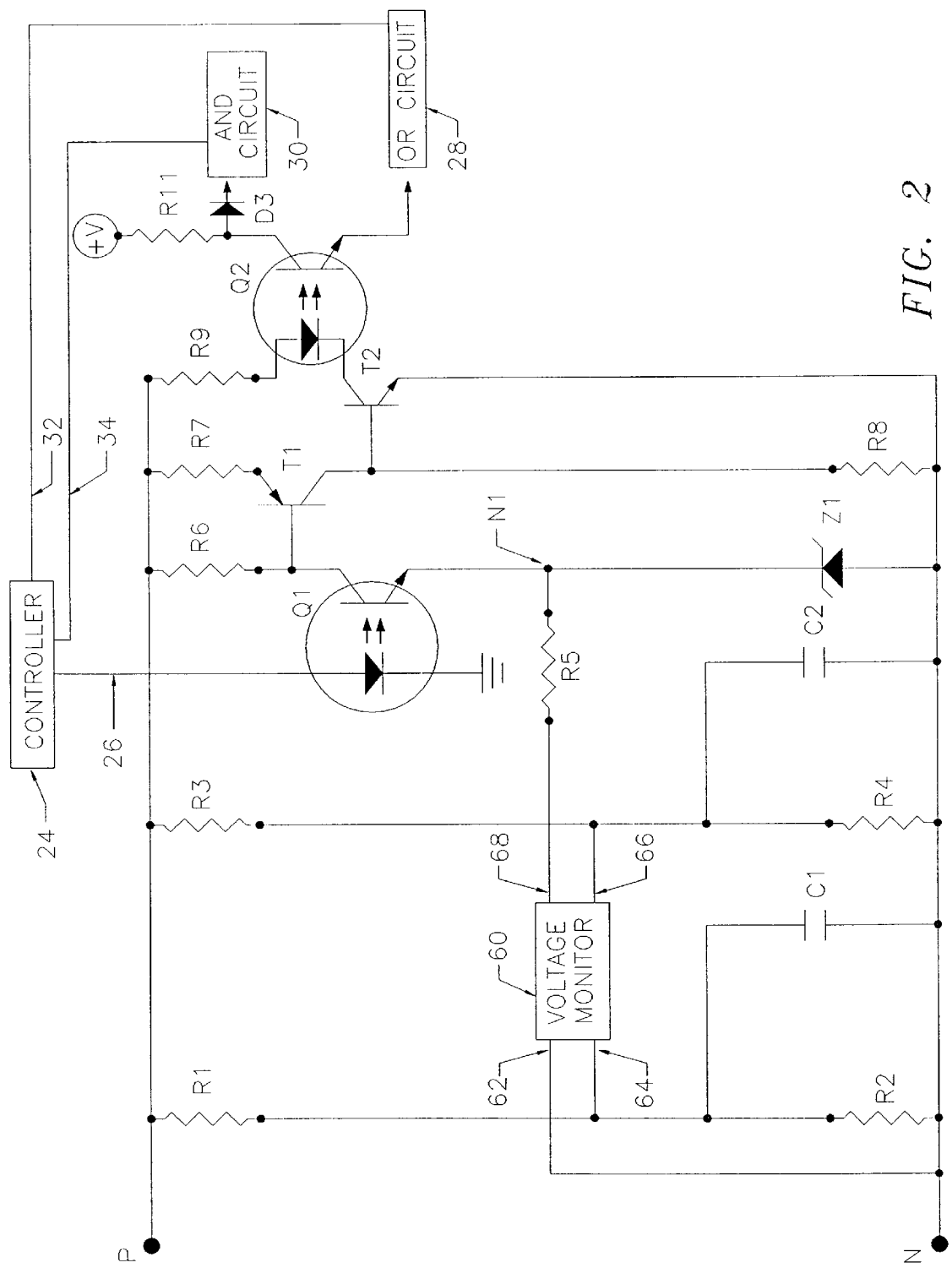
FIG. 2 shows a circuit diagram for a cell circuit of the equalization circuit.

FIG. 2 shows one of the cells Ei of the equalizer 20. The nodes P and N on the left side of the cell Ei designate the connections to the positive and negative terminals, respectively, of corresponding battery Bi. As the batteries Bi are connected in series, the negative terminal of one battery is connected to the positive terminal of the one below it, as seen in FIG. 1. Similarly, the cells Ei are "stacked" atop one another, node N of one cell also serving as node P of the cell below it.

Cell Ei has a dual role. First, while the scooter is being operated, but is in a quiescent state (low or zero current draw from the battery pack, such as upon starting, or at a stop light), cell Ei is used to monitor battery Bi for a low voltage differential ("low voltage detection") between nodes P and N ("P-N voltage"). Monitoring is done during the quiescent state to avoid artificially "low" battery readings which are due to momentary high load currents. Second, during a constant current phase of a charging operation, cell Ei is used to detect a high voltage condition and regulate the charging currents of battery Bi ("current regulation") by diverting a portion of the charging current to bypass battery Bi, if it is sufficiently charged. Both of these roles are performed with the cooperation of the controller 24 which enables the cell Ei via line 26

Low voltage detection is facilitated by a MAX836 voltage monitor 60, available from Maxim. The voltage monitor 60 has a relative ground input 62, a supply voltage input 64, signal input 66 and an signal output 68 which is active low. Resistors R1 and R2 are selected such that the supply voltage at input 64 to the voltage monitor is less than 12 volts, at a maximum expected P-N voltage of 15.6 volts. Capacitor C1 and resistor R2 together form a filter to remove voltage fluctuations at supply voltage input 64.

Resistors R3 and R4 are 1% tolerance resistors, and are selected based on the predetermined threshold voltage at which the voltage monitor 60 is set to trip. The low tolerances for R3 and R4 are needed to ensure precision in setting this predetermined threshold. Capacitor C2 and resistor R4 together form a filter, much as do components C1 and R2.

In the preferred embodiment, the threshold voltage is set to 10 volts, and so the output 68 remains high so long as the P-N voltage is greater than 10 volts. Under these conditions, node N1 is kept high, i.e., remains at the P-N voltage. Once the P-N voltage drops below this level, node N1 goes low, i.e., goes to relative ground.

To determine whether the P-N voltage is less than 10 volts, the controller 24 first enables first optocoupler Q1, which is an NEC 2702 switch. This is done via line 26. When the P-N voltage is less than 10 volts and the optocoupler Q1 is enabled, current flows through R6, through Q1's transistor portion, through R5, and is sunk to relative ground at voltage monitor's signal output 68.

As current flows through R6, the base voltage of PNP transistor T1, which is a TIP115, drops relative to its emitter input. This turns on T1, allowing current to flow through R7 and sink through R8. As the values of R7 and R8 are very small, the majority of the current between nodes P and N passes through the TIP115.

Current flowing through R8 raises the base voltage of NPN transistor T2, which is a Motorola 2N4401. When the base voltage of T2 exceeds its emitter voltage by approximately 0.6 volts, T2 will turn and begin to conduct. As R8 is 2.7Ω, T2 will turn on when a current of about 222 mA passes through R8. Thus, switch T2 turns on, only when the current bypassing the battery exceeds a predetermined amperage, a "current bypass condition".

When T2 turns on, a small current flows through R9, thus enabling second optocoupler Q2, which is also implemented as an NEC 2702 switch. The transistor side of optocoupler Q2 then outputs a status signal to the OR circuit 28 to indicate that a low voltage has been detected for the corresponding battery. This status signal to the OR circuit is ultimately fed to the controller 24 via line 32.

Table 1 presents the preferred component values for the resistors and capacitors used in the equalizer cell of FIG. 2.

TABLE 1

Component Values

| Component | Value |
| --- | --- |
| R1 | 330KΩ |
| R2 | 1MΩ |
| R3 | 768KΩ, 1% |
| R4 | 105KΩ, 1% |
| R5 | 3.3KΩ |
| R6 | 2.2KΩ |
| R7 | 4.7 Ω |
| R8 | 2.7 Ω |
| R9 | 4.7KΩ |
| C1 | 0.01 μF |
| C2 | 0.01 μF |

The above description of low voltage detection takes place when the P-N voltage is lower than 10 volts. When, on the other hand, the P-N voltage is greater than 10 volts, but less than the breakdown voltage of Zener diode Z1, node N1 assumes the P-N voltage. In such case, no current flows through resistor R6, and the base voltage of transistor T1, which is a TIP115, is not lowered. As a result, Q2 does not turn on and its transistor side does not change.

In practice, the low voltage detection is performed intermittently during quiescent states. More particularly, the controller 24 operates the first optocoupler switch Q1 in a first mode in which Q1 is activated with short pulses of predetermined length on line 26, at periodic intervals. The pulse should be long enough to account for the rise and settling time of the various components activated. In the preferred embodiment, a pulse length of 5 msec and a pulse repetition interval of 5 seconds are used. This ensures fairly regular monitoring for a low voltage condition.

As stated above, cell Ei also performs current regulation during the constant current phase of a charging procedure. This function is facilitated by controller 24, which again enables optocoupler Q1, and Zener diode Z1 which is selected for its breakdown voltage. Diode Z1 is connected between nodes N and N1, as shown in FIG. 2. Thus, the anode of the Z1 and the output of the voltage monitor 60 share the same node. And when the N1-N voltage exceeds this value, Z1 begins to conduct. Thus, diode Z1 effectively acts as a high voltage detector, and trips when the P-N voltage exceeds a predetermined threshold based on Z1's breakdown voltage, Q1's collector-emitter voltage and the voltage drop across R6.

As stated above, the constant current phase is entered after the batteries Bi have already been charged for some time during a constant voltage phase. Thus, at the time the constant current phase is entered, all the batteries will have P-N voltages of at least 10 volts, and so the voltage monitor's output 68 is high. In the preferred embodiment, during the constant current phase, the controller 24 operates the first optocoupler switch Q1 in a second mode in which Q1 is continuously activated, as a total charging current of 0.5 amps is provided to the battery pack 22 at node A1.

At first, the constant current passes through all the batteries. However, once any one of the battery voltages (i.e., the corresponding P-N voltage) approaches a predetermined maximum charging voltage to which a battery should be charged during the constant current phase, its N1-N voltage approaches the Z1's breakdown voltage, as there is a drop across Q1. In the preferred embodiment, the predetermined maximum voltage drop is about 14.8 volts, the drop across Q1 is about 1.5 volts, and Z1's breakdown voltage is about 13.3 volts. Once the breakdown voltage has been exceeded at N1-N, current flow through R6 becomes sufficient to turn on T1, causing the current that would otherwise pass through the battery to be shunted through T1 and R8 down to node N of that cell.

As explained above, when about 222 mA are shunted through T1 and R8, T2 turns on, enabling second optocoupler switch Q2, as before. Therefore, when the corresponding battery has been charged to the predetermined maximum charging voltage, the transistor portion of Q2 outputs a status signal to the AND circuit signifying that the Zener breakdown voltage has been exceeded and that this battery is fully charged.

In the present invention, substantially the same circuitry within a cell Ei is used to signal both a low voltage condition during the quiescent mode of scooter operation, as well as a high voltage (i.e., fully charged) condition during current regulation while in a constant current charging phase. In addition, this circuitry shunts current between adjacent cells to equalize the charge on the batteries in a battery pack.

Furthermore, the same optocoupler switch Q1 is operated in a first mode when cell Ei is to detect a low voltage condition, and in a second mode when cell Ei is to detect a high voltage (fully charged) condition and shunt current around its corresponding battery Bi in response thereto.

Figure 3:
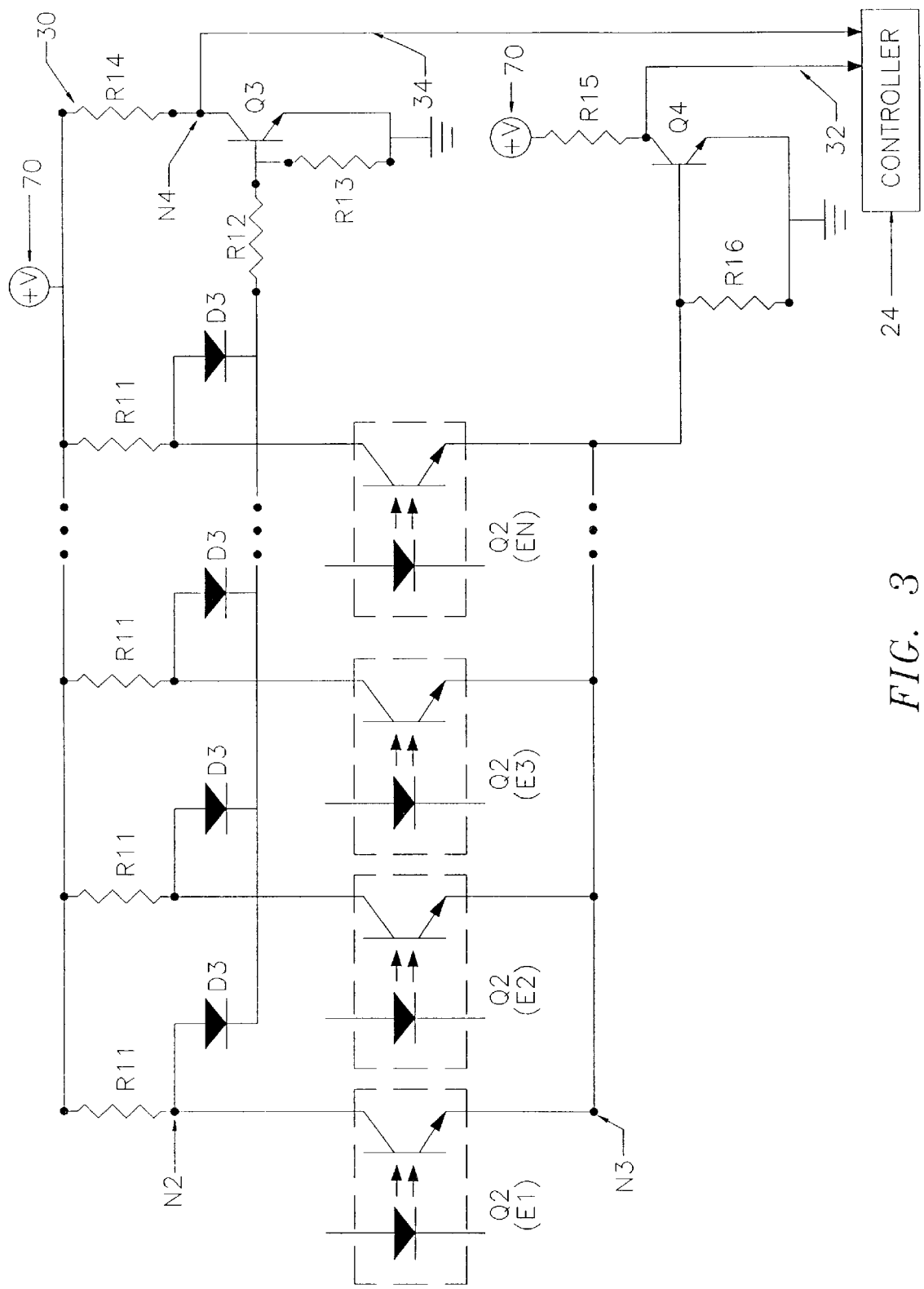
FIG. 3 shows a circuit diagram of the "AND" circuit and the "OR" circuit of the equalization circuit.

FIG. 3 shows the OR 28 and the AND 30 circuitry used in the present invention. This figure depicts a number of Q2s, each belonging to a different cell Ei. On its transistor side, the collector input of a Q2 is connected to an auxiliary power source 70 via pull-up resistor R11. In the preferred embodiment, auxiliary power source 70 is a 12 volt battery, and can be the same battery as 36.

The emitters of Q2's transistor portion are connected to the OR circuit 28. If no optocoupler Q2 is enabled, no current flows through any of Q2's emitters. Thus, there is no current flow through R16 and so the base-emitter junction of Q4, which is also a 2N4401 is not forward biased. Therefore, Q4 does not conduct, and no current passes through pull-up resistor R15. As a result, node N5 remains high, and this information is presented to controller 24 via line 32.

If, on the other hand, any one, or more, optocouplers is enabled, there will be a current flowing through R16. This will forward bias Q4's base-emitter junction and Q4 will conduct. A current passes through R15 and most of the +V drops across this resistor. As a result, node N5 goes low when one, or more, of the optocouplers Q2 are enabled, and this information is presented to controller 24 via line 32.

The collectors of Q2's transistor portion are connected to the AND circuit 30 through diodes D3. If any one of the Q2s are not enabled, then the auxiliary supply voltage of +V will draw current through resistor R11, and also through diode D3. As all diodes D3 are connected to R12, the current through R12 and R13 will forward bias Q3's base-emitter junction causing Q3 to conduct, resulting in a voltage drop across R14. Under these conditions, node N4 is low, and this information is presented to controller 24 via line 34. It is important to note that current through any one of the R11 resistors is sufficient to cause Q3 to conduct.

If, on the other hand, all of the Q2's are enabled, indicating that each cell has reached a full and balanced voltage, the voltage drop across the R11's will be sufficient to reverse bias all the D3 diodes. In this state, no current flows through R12 and R13, and so Q3 does not conduct. As a result, there is no voltage drop across R14, and node N4 switches to an active high state signalling the controller 24 though line 34 that the charge cycle is complete. Controller 24 then terminates the signal on line 48 connected to relay 49, and this prevents further charging of the battery pack 22 by the charger.

Figure 4:
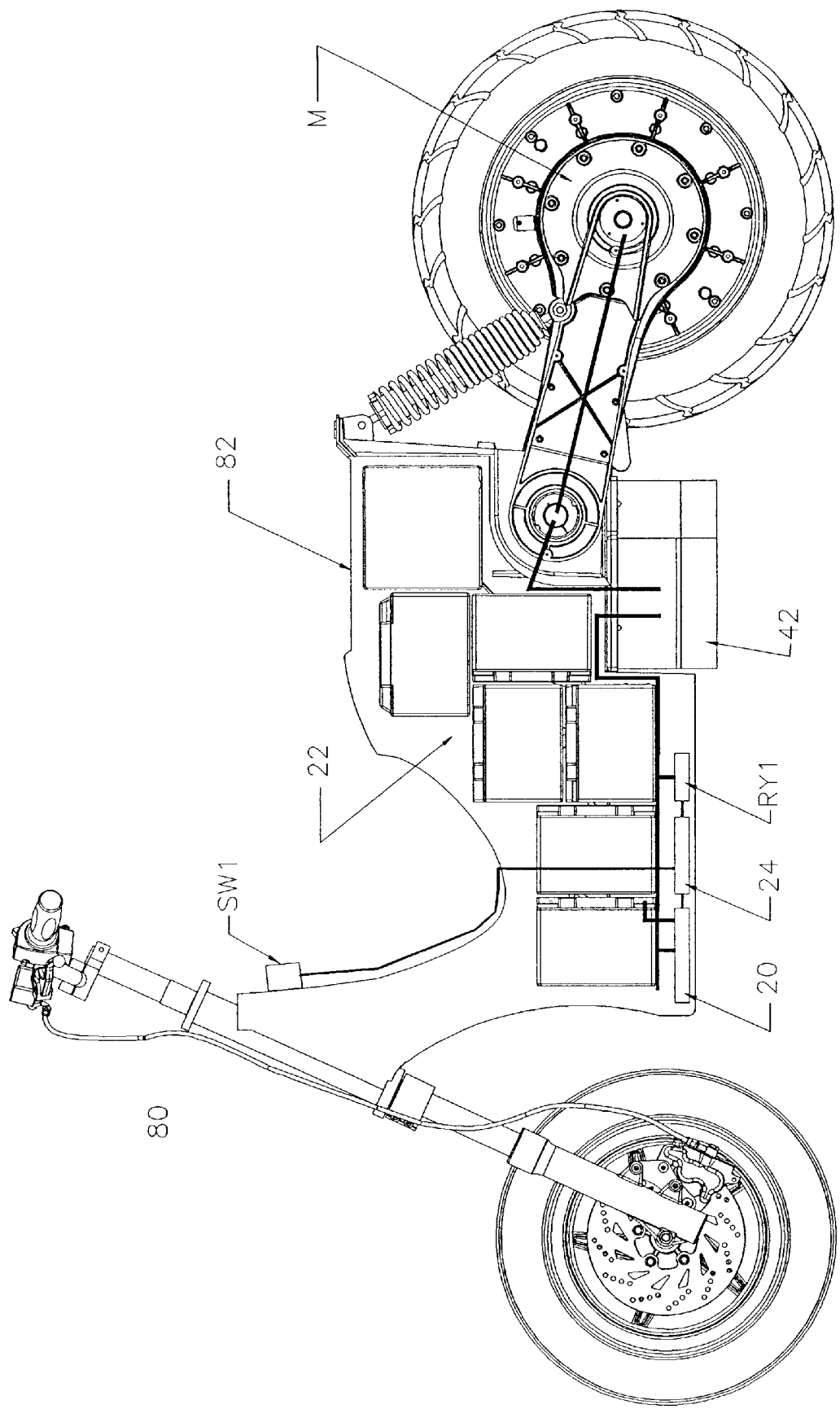
FIG. 4 shows an electric scooter having the battery pack, equalizer circuit, controller and motor.

FIG. 4 shows an electric scooter 80 equipped with the circuitry discussed above, depicted in FIG. 4 as block diagrams. The equalizer circuitry 20, controller 24, relay RY1 and motor controller 42 are all situated beneath the battery compartment 82 in a separate chamber 84. Preferably, all four of these components are provided on one or more printed circuit boards to facilitate installation and maintenance.

When the scooter is being started, a user action, such as turning of a key, closes switch SW1. This begins the initialization sequence of controller 24, which includes testing the voltage condition of the batteries. If no battery is determined to have a low voltage, and the remaining scooter systems are okay, the controller signals the power relay RY1 to close, which connects battery pack 22 to motor controller 42. Otherwise, power is not connected to motor controller, and scooter operation is prohibited.

While the scooter is being driven, during quiescent periods, the controller 24 operates first optocoupler switch Q1 in the first mode in which it is intermittently enabled and the cells of the equalizer circuit check for a low voltage condition. The controller monitors the equalizer's OR circuit output, as described above. Should any one battery be found to have low voltage, a warning signal is displayed on display 38, and the user is allowed to complete the ride.

During a constant voltage phase of a battery charging operation, controller 24 does not enable first optocoupler Q1, and the voltage condition of the batteries is not monitored.

During a constant current phase of a battery charging operation, the controller 24 operates the first optocoupler switch Q1 in the second mode in which it is continuously enabled, and the cells of the equalizer circuit check for a high voltage condition, signifying that a corresponding battery is fully charged. The controller 24 monitors the equalizer's AND circuit. If all batteries meet the high voltage condition, the controller 24 signals that the constant current phase of the charging operation has been completed.

What is claimed is:

1. An electric scooter comprising:
   a plurality of series connected batteries, each battery having a first and a second terminal and a battery voltage across said terminals;
   an equalization circuit arranged to distribute current among said plurality series connected batteries during a constant current charging phase, said equalization circuit comprising:
      a plurality of cell circuits, each cell circuit being connected across the terminals of a corresponding one of said plurality of batteries, each cell circuit having
         a first detector circuit arranged to detect a low voltage condition wherein the battery voltage is lower than a first predetermined value,
         a second detector circuit arranged to detect a high voltage condition wherein a detected voltage is higher than a second predetermined value, said second predetermined value being greater than said first predetermined value;
         a first switch arranged to enable both of said first and second detectors in response to an external signal;
         bypass circuitry arranged to bypass a charging current around the corresponding battery after detection of said high voltage condition; and
         a second switch arranged to output a status signal signifying detection of either a low voltage condition or existence of a current bypass condition wherein a current flowing through said bypass circuitry exceeds a predetermined amperage;
      a first logic circuit having an output providing a first signal when any one of said second switches outputs a status signal signifying a low voltage condition; and
      a second logic circuit having an output providing a second signal when all of said second switches output a status signal signifying existence of said current bypass condition; and
   a controller electrically connected to each of said first switches to selectively provide said external signal, wherein said controller provides said external signal in a first mode to detect a low voltage condition, when said scooter is being operated,
   said controller provides said external signal in a second mode to detect the existence of said current bypass condition, when said series-connected batteries of said scooter are being charged, and
   when the controller is in the first mode, the controller intermittently provides said external signal.

2. The electric scooter of claim 1, wherein said controller provides said external signal only during periods in which there is no current draw from said series connected batteries.

3. An electric scooter comprising:
   a plurality of series connected batteries, each battery having a first and a second terminal and a battery voltage across said terminals;
   an equalization circuit arranged to distribute current among said plurality series connected batteries during a constant current charging phase, said equalization circuit comprising:
      a plurality of cell circuits, each cell circuit being connected across the terminals of a corresponding one of said plurality of batteries, each cell circuit having
         a first detector circuit arranged to detect a low voltage condition wherein the battery voltage is lower than a first predetermined value,
         a second detector circuit arranged to detect a high voltage condition wherein a detected voltage is higher than a second predetermined value, said second predetermined value being greater than said first predetermined value;
         a first switch arranged to enable both of said first and second detectors in response to an external signal;
         bypass circuitry arranged to bypass a charging current around the corresponding battery after detection of said high voltage condition; and
         a second switch arranged to output a status signal signifying detection of either a low voltage condition or existence of a current bypass condition wherein a current flowing through said bypass circuitry exceeds a predetermined amperage;

a first logic circuit having an output providing a first signal when any one of said second switches outputs a status signal signifying a low voltage condition; and a second logic circuit having an output providing a second signal when all of said second switches output a status signal signifying existence of said current bypass condition; and a controller electrically connected to each of said first switches to selectively provide said external signal, wherein said controller provides said external signal in a first mode to detect a low voltage condition, when said scooter is being operated, said controller provides said external signal in a second mode to detect the existence of said current bypass condition, when said series-connected batteries of said scooter are being charged, and when the controller is in the second mode, the controller continuously provides said external signal.

4. An electric scooter comprising:

a plurality of series connected batteries, each battery having a first and a second terminal and a battery voltage across said terminals;

an equalization circuit arranged to distribute current among said plurality series connected batteries during a constant current charging phase, said equalization circuit comprising:

a plurality of cell circuits, each cell circuit being connected across the terminals of a corresponding one of said plurality of batteries, each cell circuit having a first detector circuit arranged to detect a low voltage condition wherein the battery voltage is lower than a first predetermined value, a second detector circuit arranged to detect a high voltage condition wherein a detected voltage is higher than a second predetermined value, said second predetermined value being greater than said first predetermined value;

a first switch arranged to enable both of said first and second detectors in response to an external signal;

bypass circuitry arranged to bypass a charging current around the corresponding battery after detection of said high voltage condition; and a second switch arranged to output a status signal signifying detection of either a low voltage condition or existence of a current bypass condition wherein a current flowing through said bypass circuitry exceeds a predetermined amperage;

a first logic circuit having an output providing a first signal when any one of said second switches outputs a status signal signifying a low voltage condition; and a second logic circuit having an output providing a second signal when all of said second switches output a status signal signifying existence of said current bypass condition;

a controller electrically connected to each of said first switches to selectively provide said external signal, wherein said controller provides said external signal in a first mode to detect a low voltage condition, when said scooter is being operated said controller provides said external signal in a second mode to detect the existence of said current bypass condition, when said series-connected batteries of said scooter are being charged; and a power relay connected to said controller and configured to selectively connect said series connected batteries to a motor controller associated with a motor of said scooter, upon receipt of an activation signal from said controller, said activation signal being provided upon starting the scooter, only if said controller receives no first signal from said first logic circuit after providing said external signal to detect a low voltage condition in said series connected batteries.

* * * * *